Nov. 30, 1926.

N. L. MILES 1,608,708

LOLLIPOP ROLL

Filed Jan. 12, 1925

INVENTOR
Norman L. Miles
BY
ATTORNEY

Patented Nov. 30, 1926.

1,608,708

UNITED STATES PATENT OFFICE.

NORMAN L. MILES, OF ST. PAUL, MINNESOTA.

LOLLIPOP ROLL.

Application filed January 12, 1925. Serial No. 1,898.

This invention relates to molding rolls and more specifically to rolls for molding plastic material, such as candy, into a form which, when folded upon itself and sealed in such folded position, will form a whistle with a stick integrally connected thereto.

Mechanisms have been fabricated for producing a tablet of candy secured to the end of a stick in the form commonly referred to as a "lollipop", but applicant is not aware of any mechanism which will produce a candy whistle as herein described and claimed.

An object of the present invention is to make a whistle by molding a plastic material into pairs of complementary shaped tablets with a connecting web between each pair to form a whistle when said tablets are folded one upon the other.

Another object of the invention is to form a pair of oppositely disposed complementary tablets having a recess therein, said recess having a supporting stud centrally located thereof to support the bottom of said recess when in a plastic condition.

Another object is to connect a pair of molded articles with a web to form a seal therebetween when said articles are folded upon one another.

In order to attain these objects there is provided, in accordance with one feature of the invention, a pair of contacting rolls having mold cavities therein to form a mass of candy into pairs of oppositely disposed tablets of a shape which, when folded one upon the other, each of said pairs of tablets shall form a whistle, and a stick embedded in one of each pair of tablets to act as a handle therefor.

Figure 1:
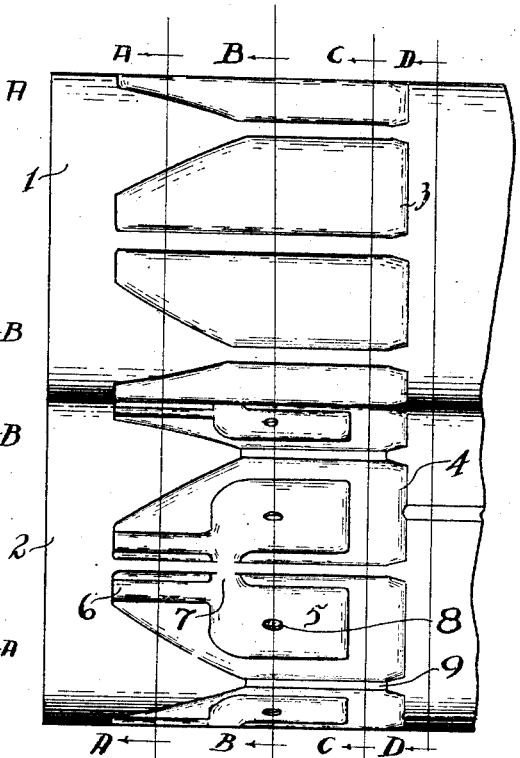

These and other features of the invention, not specifically mentioned, will be more fully brought out in the following description and the accompanying drawings, wherein:

Figure 1, is a view in side elevation of a pair of oppositely disposed rolls having mold cavities therein.

Figure 2:
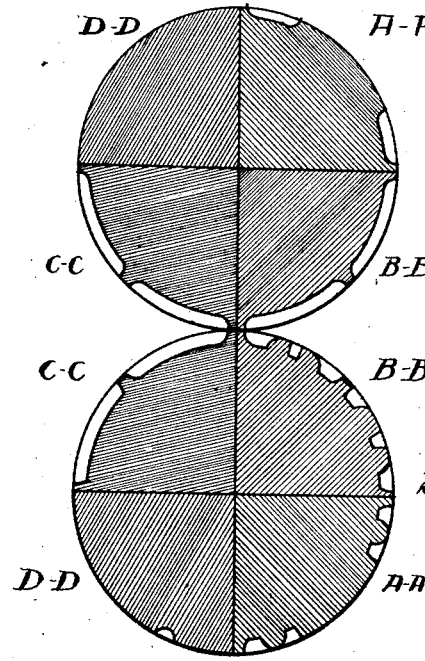

Figure 2, is a view in cross section through various parts of the mold. Segments A show a section through a pair of mold cavities on the line a—a. Segments B show a section through a pair of mold cavities on the line b—b. Segments C show a section through a pair of mold cavities on the line c—c; and segments D show a section through a pair of mold cavities on the line d—d.

Figure 3:
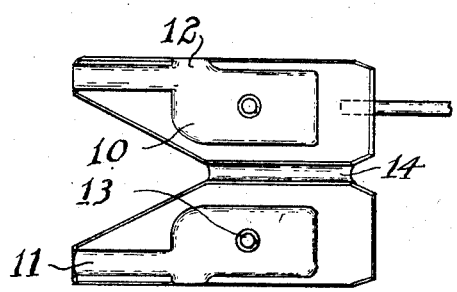
Figure 4:
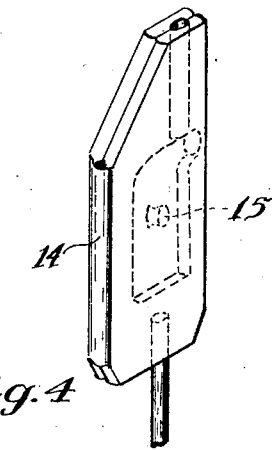

Figure 3, is a view in top elevation of a pair of candy tablets as they are discharged from the rolls, showing a stick embedded in one of the tablets to form a handle therefor; and Figure 4, is a view in isometric projection of a whistle formed by the folding together of the two complementary halves shown in Figure 3.

Referring to the drawings in detail, a pair of rolls 1 and 2 are intended to be used in conjunction with a machine for making candy tablets such as that disclosed in Patent 971,097, to Woolf, September 27, 1910. An upper roll 1 is provided with a plurality of pairs of oppositely disposed cavities 3, the bottom of each of said cavities being at a uniform depth from the periphery of the roll and the sides of which are rounded downwardly as indicated to provide a smooth back for a candy tablet molded thereby. A lower roll 2 is provided with cavities 4 similar in outline to those in upper roll 1 and disposed to coincide with the cavities in said roll when the rolls are rotated. The cavities in lower roll 2 are, however, provided with a central raised portion 5 of the general contour indicated, having a portion 6 extending outwardly to the end of the cavity, and a shorter extension 7 extending to the edge of the cavity. A hole 8 is provided in approximately the center of the raised central portion 5 of a depth equal to the depth of the cavity around the edges thereof and said hole is tapered inwardly toward its bottom so as to form a stud of candy material therein when the mold is actuated. A slight depression 9 is provided intermediate each pair of mold cavities to form a web of candy material in said cavity to join the oppositely disposed tablets of each pair as by a hinge.

As the rolls are rotated in the manner specified in the hereinbefore mentioned patent, pairs of candy tablets similar to that shown in Figure 3 are discharged by said machine.

Each tablet is of the general contour of the cavities in the mold, the raised portion 5 in each of the mold cavities in lower roll 2 forming an indention 10 in each tablet, each indentation having a trough-shaped extension 11 running outwardly to the end of said tablet, and a shorter extension 12 running to the edge thereof. A stud 13 is formed on each tablet by the hole 8 in the mold. When the pairs of tablets come from the mold, the tablet material is still in a plastic condition, and the two tablets may be folded over upon each other, a web 14 formed by the depression 9 acting as a hinge to position the parts in proper relation to each other to form a whistle such as that shown in Figure 4 of the drawings, and also acting as a seal across the rear edge of each whistle. The contacting surfaces of each pair of tablets are moistened prior to such folding operation to insure adherence of the adjoining faces when the parts are folded to the position shown in Figure 4. The stud 13 in each tablet abuts against that in the other to form a support 15 to prevent the sagging of the walls of the cavity 10 before the piece has cooled and while the material is still in a plastic condition.

What I claim is:

1. A pair of oppositely disposed coacting rolls, each of said rolls having pairs of coinciding mold cavities in the peripheries thereof, a raised portion in the center of each cavity in one of said rolls, an extension of said raised portion reaching to an end of said cavity, and a second extension thereof reaching to a side of said cavity, each pair or cavities in one of said rolls being separated by a partition which does not extend to the normal periphery of the roll.

2. A pair of oppositely disposed rolls, one of said rolls having a pair of similar, oppositely disposed mold cavities therein, the other of said rolls having a second pair of mold cavities therein to register with the first named cavities, one of said pair of cavities being of substantially constant depth and the other of said cavities having a raised central portion with a hole therein, and a pair of angularly disposed extensions from the raised central portion to form a pair of oppositely disposed tablets having a depression therein, and angularly disposed passages leading therefrom, each pair of cavities in one of said rolls being connected by a partition which does not extend to the normal periphery of the roll.

3. A pair of coacting rolls having a pair of mold cavities in each of said rolls, the mold cavities in one roll being of constant depth throughout and the mold cavities in the other roll having a raised central portion with a plurality of raised extensions radiating therefrom, each raised central portion having a hole therein to form a supporting stud.

4. A pair of coacting rolls, having a pair of mold cavities in each of said rolls, the mold cavities in one roll being arranged to register with the cavities in the other of said rolls, the mold cavities in one roll being of constant depth throughout, and the mold cavities in the other each having a raised central portion with a plurality of raised extensions radiating therefrom to sides of said cavity.

In testimony whereof I affix my signature.

NORMAN L. MILES.